US012689078B2

(12) United States Patent
Kwon et al.

(10) Patent No.: US 12,689,078 B2
(45) Date of Patent: Jul. 21, 2026

(54) BATTERY MODULE, BATTERY PACK COMPRISING BATTERY MODULE, AND VEHICLE COMPRISING BATTERY PACK

(71) Applicant: LG ENERGY SOLUTION, LTD., Seoul (KR)

(72) Inventors: Min-Ho Kwon, Daejeon (KR); Jae-Uk Ryu, Daejeon (KR); Jin-Hak Kong, Daejeon (KR); Ja-Eon Gu, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 648 days.

(21) Appl. No.: 18/025,044

(22) PCT Filed: Oct. 13, 2021

(86) PCT No.: PCT/KR2021/014148
§ 371 (c)(1),
(2) Date: Mar. 7, 2023

(87) PCT Pub. No.: WO2022/080870
PCT Pub. Date: Apr. 21, 2022

(65) Prior Publication Data
US 2023/0327236 A1      Oct. 12, 2023

(30) Foreign Application Priority Data
Oct. 13, 2020     (KR) ........................ 10-2020-0132071

(51) Int. Cl.
*H01M 10/6569*        (2014.01)
*H01M 10/6554*        (2014.01)
(Continued)

(52) U.S. Cl.
CPC ... *H01M 10/6569* (2015.04); *H01M 10/6554* (2015.04); *H01M 50/213* (2021.01);
(Continued)

(58) Field of Classification Search
CPC ............. H01M 10/613; H01M 10/643; H01M 10/6554; H01M 10/6569; H01M 10/659;
(Continued)

(56) References Cited

U.S. PATENT DOCUMENTS

2004/0258982 A1    12/2004  Coffey et al.
2011/0293986 A1    12/2011  Kozu
(Continued)

FOREIGN PATENT DOCUMENTS

CN            206711984  U      12/2017
DE      10 2008 048 002  A1      3/2010
(Continued)

OTHER PUBLICATIONS

Extended European Search Report for European Application No. 21880517.4, dated Oct. 27, 2023.
(Continued)

*Primary Examiner* — Lingwen R Zeng
(74) *Attorney, Agent, or Firm* — Birch, Stewart, Kolasch & Birch, LLP

(57) ABSTRACT

A battery module includes a plurality of cylindrical battery cells disposed upright such that a positive electrode faces downward and a negative electrode faces upward; a cell housing configured to accommodate the plurality of battery cells; a top plate configured to entirely cover an upper side of the cell housing and electrically connected to a negative electrode of each of the plurality of battery cells; a bottom plate disposed opposite the top plate to entirely cover a lower side of the cell housing and electrically connected to a positive electrode of each of the plurality of battery cells; and a phase change material filled in the cell housing so that the plurality of battery cells are partially submerged and cooling the plurality of battery cells.

10 Claims, 7 Drawing Sheets

(51) Int. Cl.

| | |
|---|---|
| *H01M 50/213* | (2021.01) |
| *H01M 50/291* | (2021.01) |
| *H01M 50/505* | (2021.01) |
| *H01M 10/613* | (2014.01) |
| *H01M 10/643* | (2014.01) |
| *H01M 10/659* | (2014.01) |
| *H01M 50/20* | (2021.01) |
| *H01M 50/271* | (2021.01) |

(52) U.S. Cl.

CPC ....... *H01M 50/291* (2021.01); *H01M 50/505* (2021.01); *H01M 10/613* (2015.04); *H01M 10/643* (2015.04); *H01M 10/659* (2015.04); *H01M 50/20* (2021.01); *H01M 50/271* (2021.01); *H01M 2220/20* (2013.01); *Y02E 60/10* (2013.01)

(58) Field of Classification Search

CPC ............. H01M 2220/20; H01M 50/20; H01M 50/213; H01M 50/249; H01M 50/271; H01M 50/291; H01M 50/505; Y02E 60/10

See application file for complete search history.

(56) References Cited

U.S. PATENT DOCUMENTS

| | | | |
|---|---|---|---|
| 2017/0001584 A1 | 1/2017 | Harris et al. | |
| 2018/0145382 A1 | 5/2018 | Harris et al. | |
| 2019/0214694 A1* | 7/2019 | Yang | .................. H01M 50/512 |
| 2019/0267684 A1* | 8/2019 | Ryu | .................. H01M 10/643 |
| 2019/0319232 A1 | 10/2019 | Ryu et al. | |
| 2019/0363411 A1 | 11/2019 | Takeuchi et al. | |

FOREIGN PATENT DOCUMENTS

| | | |
|---|---|---|
| EP | 2 403 034 A1 | 1/2012 |
| JP | 10-241739 A | 9/1998 |
| JP | 2010-211963 A | 9/2010 |
| JP | 2013-62023 A | 4/2013 |
| JP | 2013-161528 A | 8/2013 |
| JP | 2014-22151 A | 2/2014 |
| JP | 6091783 B2 | 3/2017 |
| JP | 2018-37159 A | 3/2018 |
| JP | 2019-16584 A | 1/2019 |
| JP | 2019-75303 A | 5/2019 |
| KR | 10-2011-0084959 A | 7/2011 |
| KR | 10-2016-0034675 A | 3/2016 |
| KR | 10-2018-0106687 A | 10/2018 |
| KR | 10-2018-0106688 A | 10/2018 |
| KR | 10-2019-0089907 A | 7/2019 |
| KR | 10-2019-0107839 A | 9/2019 |
| WO | WO 2018/030821 A1 | 2/2018 |

OTHER PUBLICATIONS

International Search Report (PCT/ISA/210) issued in PCT/KR2021/014148 mailed on Jan. 27, 2022.

* cited by examiner

BATTERY MODULE, BATTERY PACK COMPRISING BATTERY MODULE, AND VEHICLE COMPRISING BATTERY PACK

TECHNICAL FIELD

The present disclosure relates to a battery module, a battery pack including the battery module, and a vehicle including the battery pack.

The present application claims priority to Korean Patent Application No. 10-2020-0132071 filed on Oct. 13, 2020 in the Republic of Korea, the disclosures of which are incorporated herein by reference.

BACKGROUND ART

Secondary batteries that have high ease of application according to product groups and have electrical characteristics such as high energy density, etc. are universally applied to not only portable devices, but also electric vehicles (EVs) or hybrid vehicles (HEVs) driven by an electric drive source. These secondary batteries are attracting attention as a new energy source for improving eco-friendliness and energy efficiency in that not only the primary advantage of being able to dramatically reduce the use of fossil fuels but also the fact that no by-products are generated from the use of energy.

The types of secondary batteries that are currently widely used include a lithium ion battery, a lithium polymer battery, a nickel cadmium battery, a nickel hydrogen battery, a nickel zinc battery, etc. The operating voltage of such a unit secondary battery cell, that is, a unit battery cell, is about 2.5 V to about 4.5 V. Accordingly, when a higher output voltage is required, a plurality of battery cells are connected in series to configure a battery pack. In addition, a plurality of battery cells are connected in parallel to configure a battery pack according to the charge/discharge capacity required for the battery pack. Accordingly, the number of battery cells included in the battery pack may be set in various ways according to a required output voltage or charge/discharge capacity.

Meanwhile, when a battery pack is configured by connecting a plurality of battery cells in series/parallel, a method of configuring the battery pack by first configuring a battery module including at least one battery cell, and adding other components using the at least one battery module is common.

Since a battery pack of a multi module structure is manufactured in the form in which a plurality of secondary batteries are concentrated in a narrow space, it is important to easily dissipate heat generated from each secondary battery. Since a charging or discharging process of the secondary battery is performed by an electrochemical reaction, if heat of a battery module generated in the charging/discharging process is not effectively removed, heat accumulation occurs and as a result, deterioration of the battery module is accelerated, and in some cases, the battery module may ignite or explode.

Therefore, a high-output and large-capacity battery module and a battery pack mounted thereon necessarily require a cooling device cooling battery cells therein.

The conventional battery module generally employs a cooling structure in which heat is emitted by contacting a thermal interface material (TIM) between battery cells and a heat sink for such cooling.

However, in such a conventional cooling structure, there is a problem in that it is difficult to increase the performance of a battery module and a battery pack, and furthermore, an electric vehicle including the battery module or the battery pack due to low cooling performance.

DISCLOSURE

Technical Problem

The present disclosure is designed to solve the problems of the related art, and therefore the present disclosure is directed to providing a battery module having a structure capable of maximizing cooling performance and effectively preventing a secondary event such as a thermal runaway phenomenon caused by a high temperature venting gas from occurring when the venting gas is discharged from the battery cell, a battery pack including the battery module, and a vehicle including the battery pack.

Technical Solution

In one aspect of the present disclosure, there is provided a battery module including a plurality of battery cells disposed upright such that a positive electrode faces downward and a negative electrode faces upward; a cell housing configured to accommodate the plurality of battery cells; a top plate configured to entirely cover an upper side of the cell housing and electrically connected to the negative electrode of each of the plurality of battery cells; a bottom plate disposed opposite the top plate to entirely cover a lower side of the cell housing and electrically connected to the positive electrode of each of the plurality of battery cells; and a phase change material filled in the cell housing such that the plurality of battery cells are partially submerged and cooling the plurality of battery cells.

The battery module may further include a heat sink mounted on an upper side of the top plate and configured to cool the plurality of battery cells.

The phase change material may be vaporized when a temperature of the plurality of battery cells rises to move toward the top plate, and may be liquefied by the heat sink to move toward the bottom plate.

The battery module may further include a guide rib provided on an upper side of an inner wall of the cell housing and configured to guide a movement of the liquefied phase change material toward the bottom plate.

The battery module may further include at least one cell fixing member configured to fix the plurality of battery cells so as to prevent movement of the plurality of battery cells in the cell housing.

The cell fixing member may be provided in a pair, and the pair of cell fixing members may include an upper cell fixing member into which upper portions of the plurality of battery cells are inserted and fixed to an upper side of an inner portion of the cell housing; and a lower cell fixing member into which lower portions of the plurality of battery cells are inserted and fixed to a lower side of the inner portion of the cell housing.

A plurality of cell insertion holes for insertion of the plurality of battery cells may be formed in the upper cell fixing member and the lower cell fixing member.

An edge of the top plate may be seamed with an edge of the cell housing.

In another aspect of the present disclosure, there is provided a battery pack including at least one battery module according to an embodiment as described above and a pack case configured to package the at least one battery module.

In another aspect of the present disclosure, there is provided a vehicle including at least one battery pack according to an embodiment as described above.

The at least one cell fixing member may have a plurality of cell insertion holes for insertion of the plurality of battery cells, and a plurality of protection may extend upward from the bottom plate into a respective one of the plurality of cell insertion holes.

A flow path may extend from an upper surface of the at least one cell fixing member to a surface of at least one of the plurality of cell insertion holes.

Advantageous Effects

According to various embodiments as described above, provided may be a battery module having a structure capable of not only maximizing cooling performance but also effectively preventing a secondary event such as a thermal runaway phenomenon caused by a high temperature venting gas from occurring when the venting gas is discharged from the battery cell, a battery pack including the battery module, and a vehicle including the battery pack.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

FIG. 1 is a view for explaining a battery module according to an embodiment of the present disclosure.

FIG. 8 is a view illustrating a part of a battery module according to another embodiment of the present disclosure.

MODE FOR DISCLOSURE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure. In addition, in order to help the understanding of the invention, the accompanying drawings are not shown in actual scale, but dimensions of some components may be exaggeratedly shown.

Figure 1:
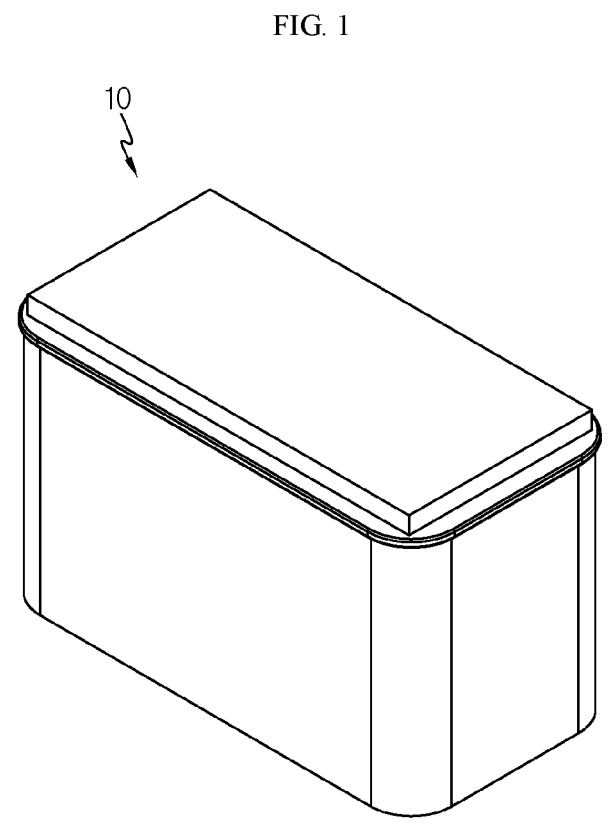
Figure 2:
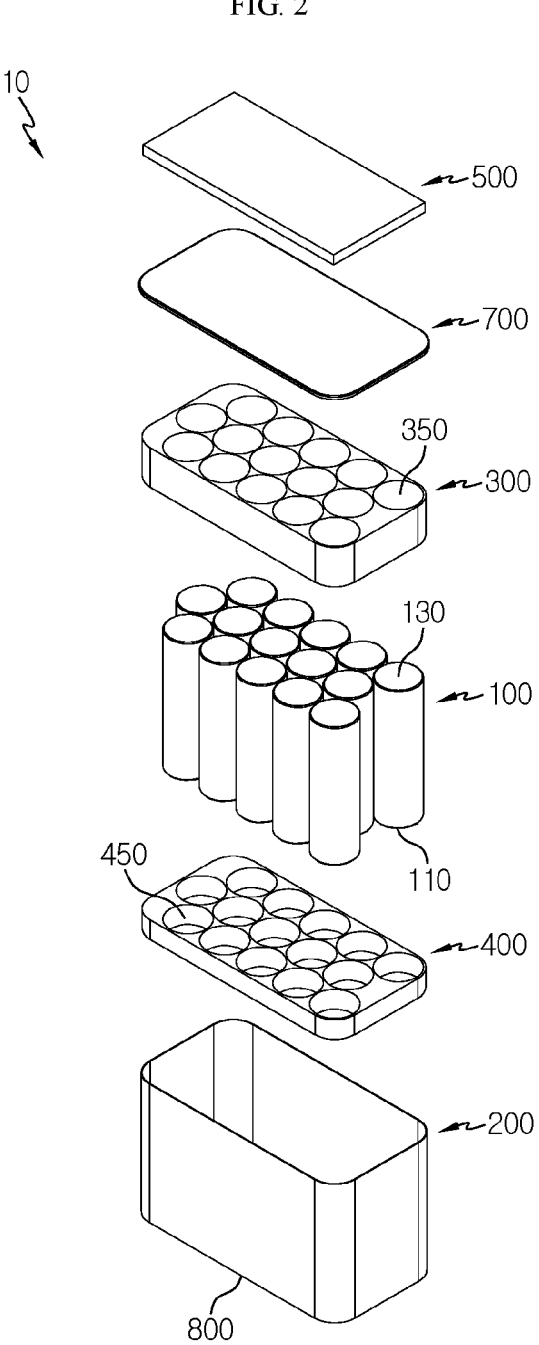
FIG. 2 is an exploded perspective view of the battery module of FIG. 1.
Figure 3:
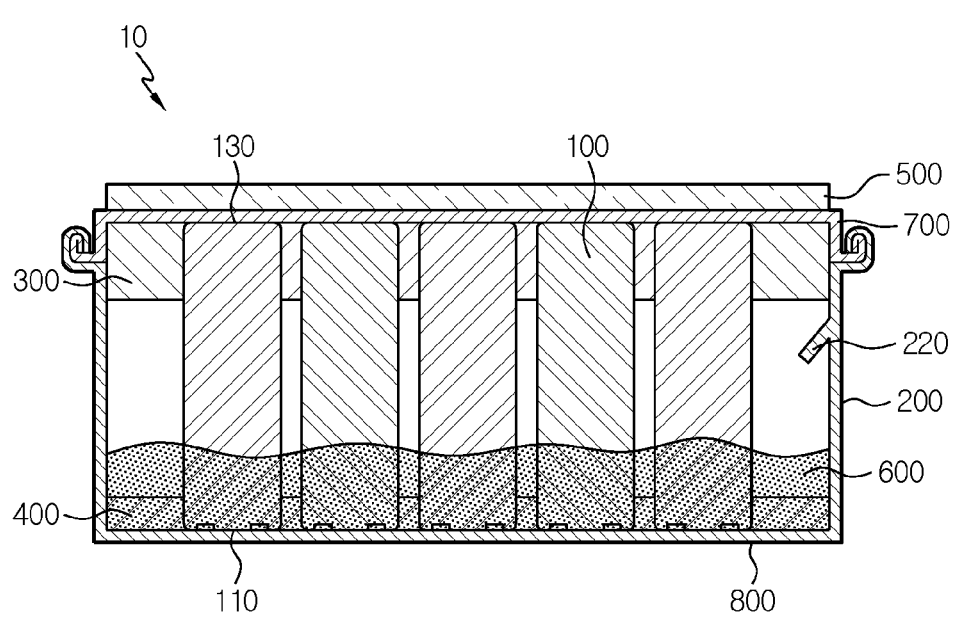
FIG. 3 is a cross-sectional view of the battery module of FIG. 1.
Figure 4:
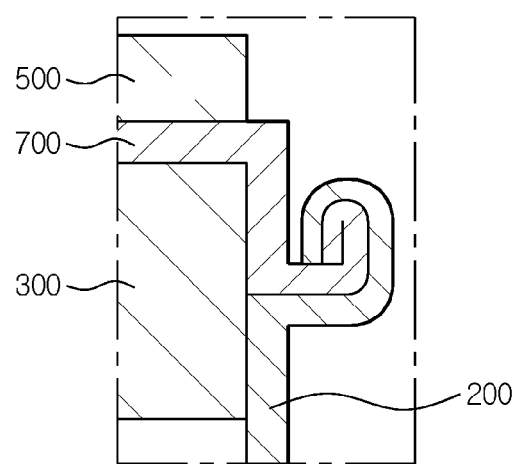
FIG. 4 is a view for explaining coupling of a top plate and a cell housing of the battery module of FIG. 1.
Figure 5:
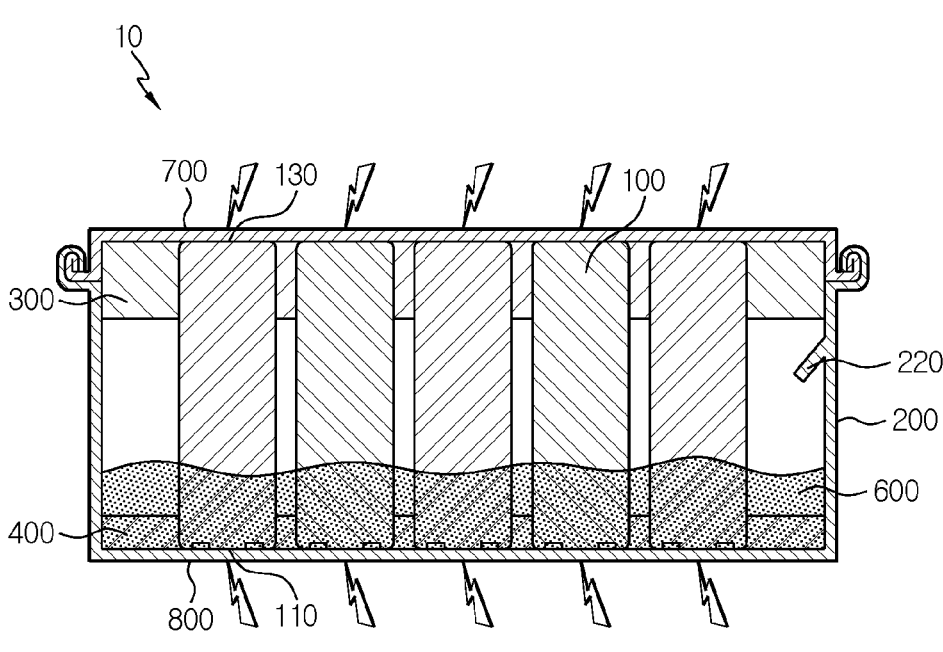
FIG. 5 is a view for explaining an electrode connection of battery cells of the battery module of FIG. 1.
Figure 6:
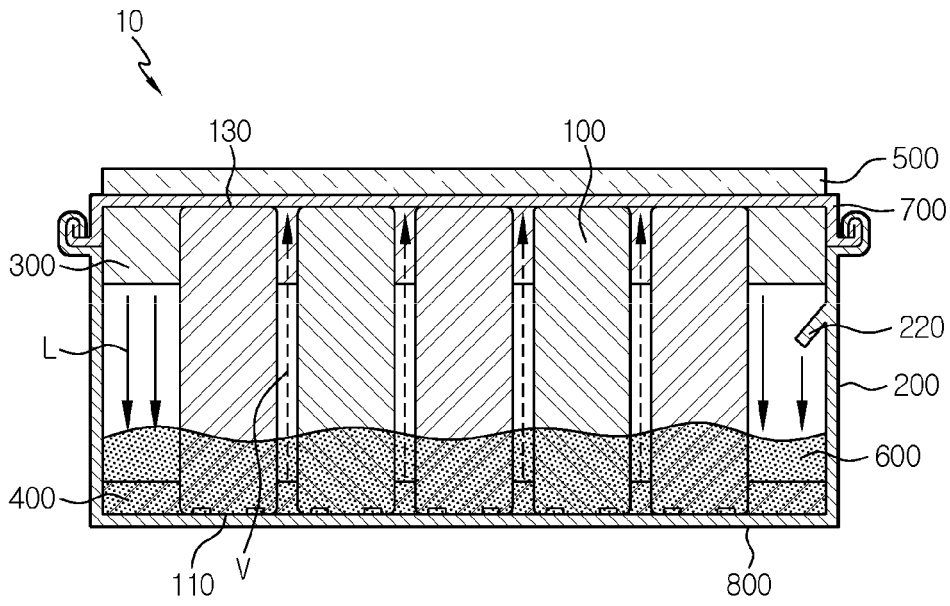
FIG. 6 is a view for explaining a cooling principle of the battery module of FIG. 1.

FIG. 1 is a view for explaining a battery module according to an embodiment of the present disclosure, FIG. 2 is an exploded perspective view of the battery module of FIG. 1, FIG. 3 is a cross-sectional view of the battery module of FIG. 1, FIG. 4 is a view for explaining coupling of a top plate and a cell housing of the battery module of FIG. 1, FIG. 5 is a view for explaining an electrode connection of battery cells of the battery module of FIG. 1, and FIG. 6 is a view for explaining a cooling principle of the battery module of FIG. 1.

Referring to FIGS. 1 to 6, a battery module 10 may include a battery cell 100, a cell housing 200, cell fixing members 300 and 400, a heat sink 500, a phase change material 600, a top plate 700, and a bottom plate 800.

The battery cell 100 may be provided in plurality, and the plurality of battery cells 100 may be provided as a cylindrical secondary battery. The plurality of battery cells 100 may be stacked and electrically connected to each other.

When the battery cell 100 is a cylindrical secondary battery, a positive electrode 110 may be provided at a center portion of one side surface of the battery cell 100 in a longitudinal direction. A negative electrode 130 may be provided at a center portion of the other side surface of the battery cell 100 in the longitudinal direction. A venting portion (not shown) which is vented to lower an internal pressure of the battery cell 100 to ensure safety when the internal pressure of the battery cell 100 increases to a certain level or more may be provided on a surface on which the positive electrode 110 is formed.

The cell housing 200 may accommodate the plurality of battery cells 100. To this end, an accommodation space capable of accommodating the plurality of battery cells 100 may be provided in the cell housing 200.

A guide rib 220 may be provided inside the cell housing 200.

The guide rib 220 may be provided on an upper side of an inner wall of the cell housing 200, and may guide a movement of the phase change material 600 to a lower side when the phase change material 600 is liquefied L which will be described below. Specifically, the guide rib 220 may guide a faster movement of the phase change material 600 that is vaporized V and then liquefied L again as the internal temperature rises toward the bottom plate 800, which will be described below.

The cell fixing members 300 and 400 may fix the plurality of battery cells 100 to prevent movement of the plurality of battery cells 100 in the cell housing 200.

Such cell fixing members 300 and 400 may be provided as a pair. The pair of cell fixing members 300 and 400 may include an upper cell fixing member 300 and a lower cell fixing member 400.

The upper cell fixing member 300 into which upper portions of the plurality of battery cells 100 are inserted may be fixed to the upper side of the inner portion of the cell housing 200. To this end, a plurality of cell insertion holes 350 into which the upper portions of the plurality of battery cells 100 are inserted may be formed in the upper cell fixing member 300.

The lower cell fixing member 400 into which lower portions of the plurality of battery cells 100 are inserted may be fixed to the upper side of the inner portion of the cell housing 200. To this end, a plurality of cell insertion holes 450 into which the lower portions of the plurality of battery cells 100 are inserted may be formed in the lower cell fixing member 400.

The heat sink 500 is for cooling the plurality of battery cells 100, and may be mounted on an upper side of the top plate 700 which will be described below. The heat sink 500 may be mounted on the cell housing 200 instead of the upper side of the top plate 700 which will be described below.

The phase change material 600 functions as an insulating oil for efficiently cooling the plurality of battery cells 100, and may be partially filled in the cell housing 200. Accordingly, the plurality of battery cells 100 may be partially submerged in the phase change material 600 within the cell housing 200.

The phase change material 600 may be vaporized V when the temperature of the plurality of battery cells 100 rises to move toward the top plate 700 which will be described below, and may be liquefied L by the heat sink 500 to move toward the bottom plate 800 which will be described below. Such vaporization V and liquefaction L may be cyclically repeated, and through this, cooling of the battery cells 100 may be more effectively performed.

The phase change material 600 may be made of a fluorine-based material having a low boiling point for more effective circulation. For example, the phase change material 600 may include a material having a boiling point of between 35 degrees and 50 degrees. In addition, the phase change material 600 may include a material having an extinguishment function. Accordingly, when a fire occurs in the battery module 10, it is possible to quickly extinguish the fire through the phase change material 600.

The top plate 700 may be coupled to the cell housing 200 so as to entirely cover the upper side of the cell housing 200. Here, the top plate 700 may be coupled to the cell housing 200 through a seaming structure. This is to maximize an airtight structure of the cell housing 200, and to prevent evaporation of the phase change material 600 in the cell housing 200. The seaming structure may be formed in an edge of the top plate 700 and an upper edge of the cell housing 200. That is, the edge of the top plate 700 may be seamed with the upper edge of the cell housing 200.

The top plate 700 is electrically connected to the negative electrode 130 of the plurality of battery cells 100. To this end, the top plate 700 may be made of a metal material, and may be welded to the negative electrode 130 of the plurality of battery cells 100. That is, in the present embodiment, the top plate 700 may function not only as a cover for sealing the cell housing 200, but also as a bus bar for the electrical connection of the battery cells 100.

Accordingly, in the present embodiment, since both of these functions may be implemented through the top plate 700, a separate bus bar structure for the electrical connection between the negative electrodes 130 of the battery cells 100 is not required.

Meanwhile, for insulation between the top plate 700 and the cell housing 200, the top plate 700 may be insulated in a coupling portion with the cell housing 200. In the present embodiment, the top plate 700 may be insulated in a seamed edge part and then insulated from the cell housing 200. If the cell housing 200 includes a non-metal material instead of a metal material, such insulation may be omitted.

The bottom plate 800 may be disposed opposite to the top plate 700 to entirely cover the lower side of the cell housing 200. Such a bottom plate 800 may be integrally formed with the cell housing 200 or may be separately provided and mounted on a bottom portion of the cell housing 200.

Such a bottom plate 800 may be electrically connected to the positive electrode 110 of the plurality of battery cells 100. As such, the bottom plate 800 may function as not only a cover for sealing the bottom portion of the cell housing 200, but also a bus bar for the electrical connection of the battery cells 100 together with the top plate 700.

To this end, the bottom plate 800 may be made of a metal material, and may be welded and coupled to the positive electrodes 110 of the plurality of battery cells 100. Meanwhile, when the bottom plate 800 is integrally formed with the cell housing 200, the cell housing 200 may also be made of a metal material. In this case, for insulation from the top plate 700, as described above, the cell housing 200 may be insulated from the top plate 700 in a coupling portion. If the bottom plate 800 has a structure in which the cell housing 200 is separately mounted, the cell housing 200 may be made of a non-metal material, and in this case, the insulation may be omitted.

Accordingly, in the present embodiment, both the sealing of the cell housing 200 and the electrical connection of the positive electrodes 110 of the battery cells 100 may be implemented through the bottom plate 800, and thus a separate bus bar structure for the connection of the positive electrodes 110 of the battery cells 100 is not required.

As such, in the present embodiment, since the top plate 700 and the bottom plate 800 for sealing the cell housing 200 also implement a bus bar function for the electrical connection of the electrodes 110 and 130 of the battery cells 100, a separate additional bus bar structure may be omitted, thereby reducing the manufacturing cost of the battery module 10 and improving manufacturing efficiency.

Meanwhile, in the present disclosure, the battery cell 100 is disposed upright in the cell housing 200 such that the positive electrode 110 faces downward and the negative electrode 130 faces upward. That is, as described above, the battery cell 100 is disposed to have directionality such that the positive electrode 110 is in face-to-face contact with the bottom plate 800 and the negative electrode 130 is in face-to-face contact with the top plate 700.

In the case of a cylindrical battery cell, the positive electrode 110 and the negative electrode 130 are respectively formed on both side surfaces in the longitudinal direction, and a venting portion, which is designed to be weak in terms of rigidity in comparison with a surrounding region and is preferentially broken when the internal pressure of the battery cell 100 increases so that gas generated inside the battery cell 100 may be discharged, is formed in the surface on which the positive electrode 110 is formed.

The battery module 10 according to the present disclosure has a structure in which the surface on which the venting portion is formed, that is, the surface on which the positive electrode 110 is formed, faces downward, and thus the positive electrode 110 is immersed in the liquefied phase change material 600. Therefore, the battery module 10 according to an embodiment of the present disclosure may prevent the temperature inside the battery module 10 from rapidly increasing when a high temperature venting gas is ejected due to an increase in the internal pressure of the battery cell 100, thereby preventing the occurrence of a secondary event due to a gas ejection, and securing safety in using the secondary battery.

In addition, the battery module 10 according to the present embodiment may further secure the capacity of the battery cells 100 by the volume of a separate additional bus bar structure which is omitted even in terms of energy density. In addition, the battery module 10 according to the present embodiment may also maximize cooling performance through the phase change material 600.

Figure 7:
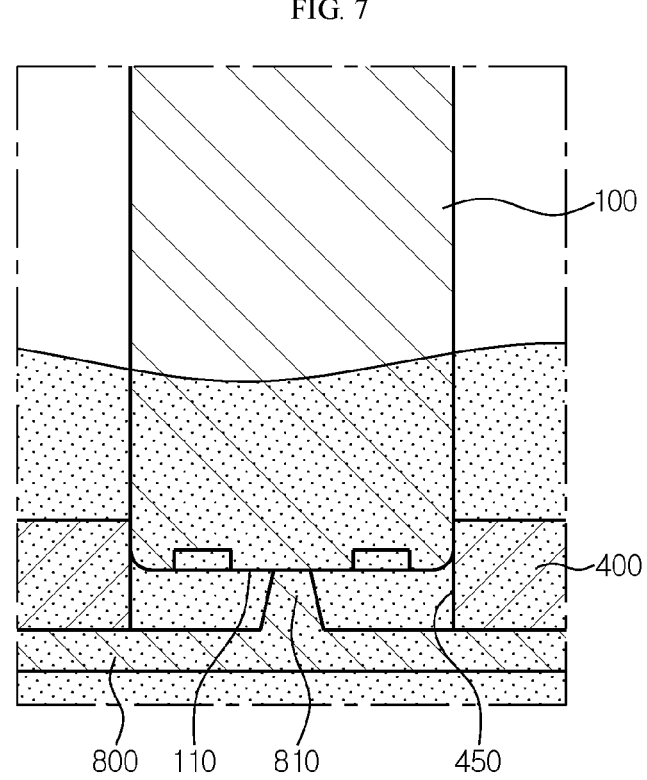
FIG. 7 is a view illustrating a part of a battery module according to another embodiment of the present disclosure.

Next, a battery module according to another embodiment of the present disclosure will be described with reference to FIG. 7. The battery module according to another embodiment of the present disclosure is merely different from the battery module according to the previous embodiment in that a contact protrusion 810 is formed on the bottom plate 800, and other components are substantially the same. Therefore, in describing the battery module according to another embodiment of the present disclosure, descriptions redundant with those of the previous embodiment will be omitted, and only the differences will be mainly described.

The contact protrusion 810 is formed to protrude upward from the bottom plate 800. The contact protrusion 810 is formed at a position corresponding to the positive electrode 110 of the battery cell 100 and is in contact with the positive electrode 110. The contact protrusion 810 may be provided as many as the number of battery cells 100.

The contact protrusion 810 is used to separate between one surface of the battery cell 100 on which the positive electrode 110 is formed in the cell insertion hole 450 formed in the lower cell fixing member 400 and the bottom plate 800, which provides a space in which the liquefied phase change material 600 may be filled. The contact protrusion 810 may be made of a conductive material for electrical connection of the plurality of battery cells 100.

As such, when a space is formed between the positive electrode 110 and the bottom plate 800 in the cell insertion hole 450 formed in the lower cell fixing member 400, and the phase change material 600 is filled therein, upon venting of the battery cell 100, effective cooling is possible and the occurrence of a secondary event such as ignition by a high temperature gas may be effectively prevented.

Figure 8:
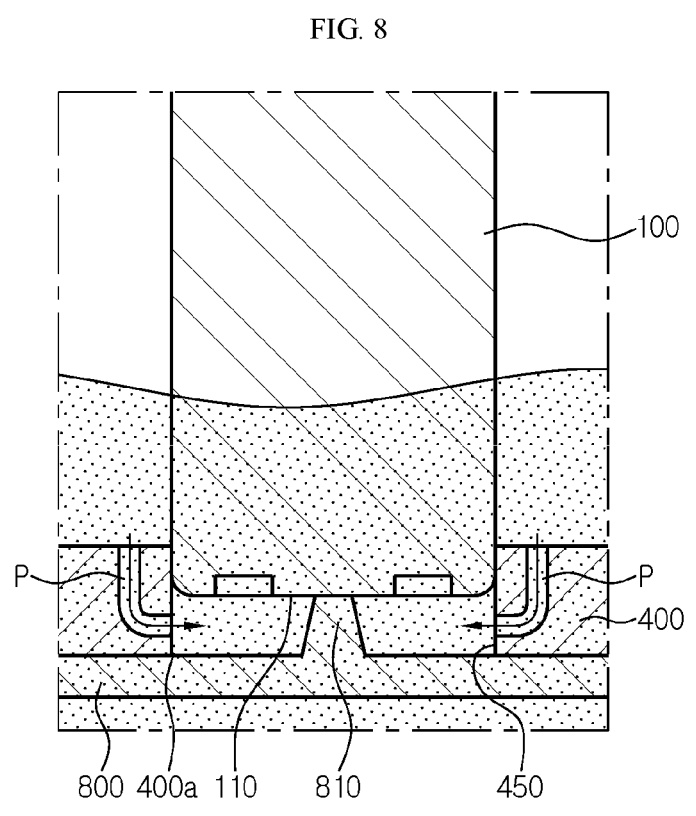

Next, a battery module according to another embodiment of the present disclosure will be described with reference to FIG. 8. The battery module according to another embodiment of the present disclosure is merely different from the battery module shown in FIG. 7 in that a flow path P through which the liquefied phase change material 600 may move is formed in the lower cell fixing member 400, and other components are substantially the same. Accordingly, in describing the battery module according to another embodiment of the present disclosure, the flow path P will be mainly described, and descriptions redundant with those of the previous embodiments will be omitted.

The flow path P is formed in the lower cell fixing member 400, and penetrates between an upper surface of the lower cell fixing member 400 and an inner side surface of the cell insertion hole 450 formed in the lower cell fixing member 400. The liquefied phase change material 600 may be smoothly introduced into a space between the positive electrode 110 and the bottom plate 800 through the flow path P.

Figure 9:
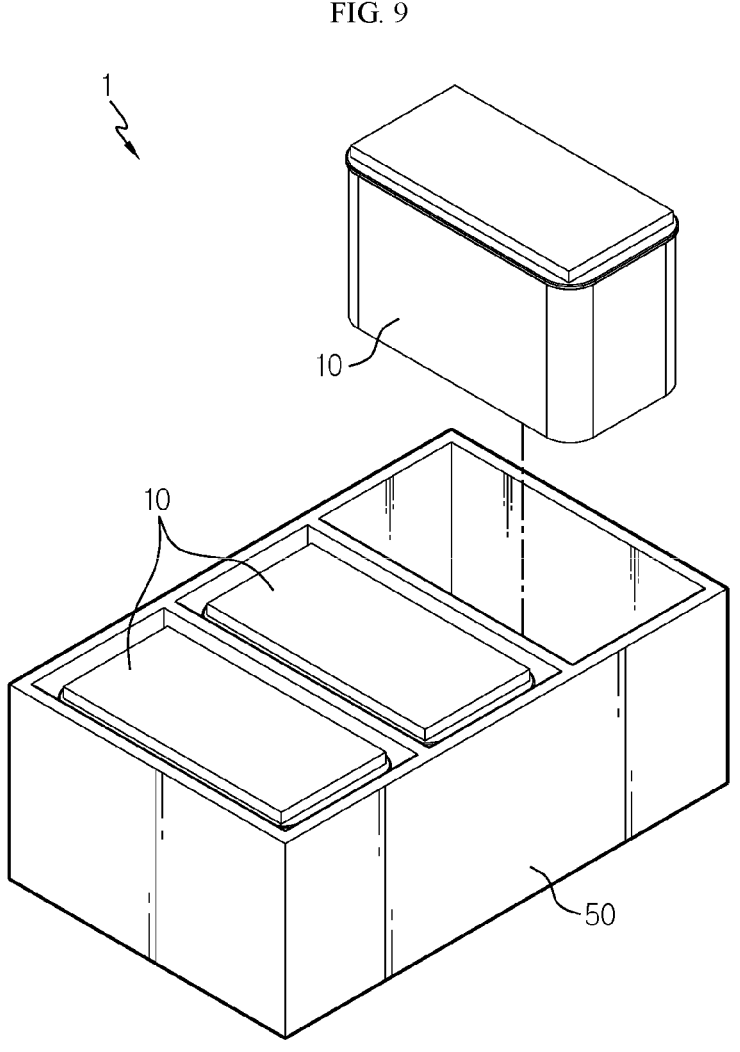
FIG. 9 is a view for explaining a battery pack according to an embodiment of the present disclosure.

FIG. 9 is a view for explaining a battery pack according to an embodiment of the present disclosure.

Referring to FIG. 9, a battery pack 1 may include the at least one battery module 10 according to the previous embodiment and a pack case 50 packaging the at least one battery module 10.

Such a battery pack 1 may be provided in a vehicle, as a fuel source of the vehicle. As an example, the battery pack 1 may be provided in an electric vehicle, a hybrid vehicle, and the vehicle in other methods of using the other battery pack 1 as a fuel source. In addition, the battery pack 1 may be provided in other devices such as an energy storage system that uses a secondary battery, instruments, and facilities, in addition to the vehicle.

As such, the vehicle according to the present embodiment and devices such as the vehicle, instruments, and facilities including the battery pack 1 include the battery module 10 described above, and thus the battery pack 1 having all the advantages owing to the battery module 10 described above and devices such as the vehicle, instruments, and facilities including such a battery pack 1 may be implemented.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A battery module comprising:
a plurality of battery cells disposed upright such that a positive electrode faces downward and a negative electrode faces upward;
a cell housing configured to accommodate the plurality of battery cells;
a top plate configured to entirely cover an upper side of the cell housing and electrically connected to the negative electrode of each of the plurality of battery cells;
a bottom plate disposed opposite the top plate to entirely cover a lower side of the cell housing and electrically connected to the positive electrode of each of the plurality of battery cells;
a phase change material filled in the cell housing such that the plurality of battery cells are partially submerged, and cooling the plurality of battery cells;
a lower cell fixing member into which lower portions of the plurality of battery cells are inserted and fixed to a lower side of an inner portion of the cell housing, the lower cell fixing member having a plurality of cell insertion holes for insertion of the plurality of battery cells; and
a plurality of protrusions extending upward from the bottom plate into a respective one of the plurality of cell insertion holes, each protrusion being surrounded by the phase change material in the respective cell insertion hole.

2. The battery module of claim 1, further comprising a heat sink mounted on an upper side of the top plate and configured to cool the plurality of battery cells.

3. The battery module of claim 2, wherein the phase change material is vaporized when a temperature of the plurality of battery cells rises to move toward the top plate, and is liquefied by the heat sink to move toward the bottom plate.

4. The battery module of claim 3, further comprising a guide rib provided on an upper side of an inner wall of the cell housing and configured to guide a movement of the liquefied phase change material toward the bottom plate.

5. The battery module of claim 1, further comprising
an upper cell fixing member into which upper portions of the plurality of battery cells are inserted and fixed to an upper side of an inner portion of the cell housing.

6. The battery module of claim 5, wherein a plurality of cell insertion holes for insertion of the plurality of battery cells are formed in the upper cell fixing member.

7. The battery module of claim 1, wherein an edge of the top plate is seamed with an edge of the cell housing.

8. A battery pack comprising:

at least one battery module according to claim 1; and a pack case configured to package the at least one battery module.

9. A vehicle comprising a battery pack according to claim 8.

10. The battery module of claim 1, further comprising a flow path extending from an upper surface of the lower cell fixing member to at least one of the plurality of cell insertion holes.

* * * * *